UNITED STATES PATENT OFFICE 2,534,088

DINITRILE COMPOUND

Irving D. Webb, Wilmington, Del., assignor to E. I. du Pont de Nemours & Company, Wilmington, Del., a corporation of Delaware No Drawing. Application June 21, 1949,
Serial No. 100,527

1 Claim. (Cl. 260—464)

This invention relates to a new dinitrile compound, and more particularly, it relates to a new dinitrile compound containing a cyclohexene ring structure.

Dinitriles have been the subject of considerable technical interest in recent years because of their ready convertibility into diamines, dibasic acids, and diesters.

It is an object of this invention to provide a new dinitrile compound. It is also an object of this invention to provide a new dinitrile compound in which the nitrile groups are separated by four carbon atoms, two of which form part of a cyclohexene ring structure. A further object of the invention is to provide a dinitrile compound which may be easily converted to intermediates which are valuable in the preparation of linear polyamides and polyesters. Other objects of the invention will appear hereinafter.

According to this invention, there is provided a new dinitrile compound, 4-cyano-5-(beta-cyanoethyl) cyclohexene, having the following formula

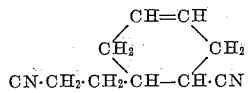

The new compound of the present invention can be partially hydrogenated to give either the corresponding cyclohexane derivative, 1-cyano-2-(beta-cyanoethyl) cyclohexane, or the corresponding diaminocyclohexene derivative, 4-aminomethyl-5-(gamma-aminopropyl) cyclohexene; or it can be hydrogenated completely to give the novel saturated diamine, 1-aminomethyl-2-(gamma-aminopropyl) cyclohexane, having the formula

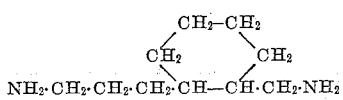

Alternately, either the 4-cyano-5-(beta-cyanoethyl) cyclohexene or the 1-cyano-2-(beta-cyanoethyl) cyclohexane can be partially or completely hydrolyzed to give the corresponding amides, cyano acids or dibasic acids, such as 4-cyano-5-(beta-carboxyethyl) cyclohexene, 1-carboxy-2-(beta-cyanoethyl) cyclohexane, 4-carboxy-5-(beta-carboxyethyl) cyclohexene, and 1-carboxy-2-(beta-ctarboxyethyl) cyclohexane. The cyano acids can be hydrogenated to give amino acids, and the acid groups of either the cyano acids or the dibasic acids can be esterified with any desired alcoholic compound to give cyano esters or diesters.

The diamines, the dibasic acids, and the diesters thus prepared are particularly useful in the production of novel polyamides which contain either cyclohexene or cyclohexane groupings in the polymer chain. Particularly useful polyamides are those obtained by condensing 1-aminomethyl-2-(gamma-aminopropyl) cyclohexane with terephthalic acid or its esters. These polyamides exhibit extremely low water sensitivity and hence are outstanding for the manufacture of bristles. Other dibasic acids which may be employed in place of terephthalic acid include glutaric, adipic, pimelic, suberic, azelaic, sebacic, β-ethyladipic, and many others.

The novel compound of the present invention may be prepared in a number of different ways. Preferably it is prepared by a condensation reaction between butadiene and 1,4-dicyano-1-butene, as described in several of the examples which follow.

As disclosed in the Hager patent, U. S. 2,451,386, the compound, 1,4-dicyano-1-butene may be obtained by isomerization of 1,4-dicyano-2-butene, which latter compound is disclosed by Cass and Rogers in U. S. 2,342,101. The 1,4-dicyano-1-butene used in preparing the novel compound of the present invention may be prepared in situ by isomerization of 1,4-dicyano-2-butene in the presence, for instance, of a base such as trimethylamine, triethylamine, piperidine, or the like. Either of the two isomers of 1,4-dicyano-1-butene, or mixtures thereof may be employed. Poor yields have been obtained in attempts to react butadiene directly with 1,4-dicyano-2-butene.

The novel compound of the present invention exists in the form of a cis and a trans isomer. The cis isomer is obtained when one employs cis-1,4-dicyano-1-butene as the starting material, and the trans isomer is obtained when one starts with trans-1,4-dicyano-1-butene. When starting with a mixture of the two isomers of 1,4-dicyano-1-butene, a mixture of isomers of 4-cyano-5-(beta-cyanoethyl) cyclohexene is produced.

The reaction between 1,4-dicyano-1-butene and butadiene may be carried out in a batch or in a continuous method, either with or without a solvent. Suitable solvents which may be employed include benzene, dioxane, tetrachloroethane, alcohols, organic acids, and the like. Reaction temperatures of from 150° to 300° C. may be used, with temperatures in the range of 190° to 260° C. being preferred. An excess of either butadiene or dicyanobutene may be employed. The use of any of the generally known polymerization inhibitors is recommended in order to prevent a number of possible side reactions, notably the dimerization of butadiene to vinylcyclohexene. Pressures of from 200 to 600 atmospheres, or higher, either with or without blanketing by an inert gas such as nitrogen, have been employed satisfactorily. Pressures within this range are developed autogenously upon heating the reactants in an autoclave.

*Example 1.*—Preparation of unsaturated dinitrile. Fifty grams of 1,4-dicyano-1-butene, 27 g. of butadiene, 50 ml. of benzene (as a solvent), and 1 g. of hydroquinone (as a polymerization inhibitor), were added to a copper-lined shaker tube and heated under autogenous pressure at a temperature of from 197° to 210° C. for three hours. The liquid product, after being rinsed with benzene, was distilled to yield a fraction having a boiling point of 145° C./2 mm. and a refractive index, $n_D^{25°C}=1.4950$. This fraction, upon analysis, was found to be the compound, 4-cyano-5-(beta-cyanoethyl)-cyclohexene. Calculated for $C_{10}H_{12}N_2$: C, 75.0%; H, 7.5%; N, 17.5%. Found: C, 73.8%; H, 7.3%; N, 16.9%. The dinitrile was hydrolyzed to the corresponding dibasic acid by heating with dilute hydrochloric acid.

*Example 2.*—Preparation of unsaturated dinitrile. Eighty grams of 1,4-dicyano-1-butene, 100 ml. of benzene, 1 g. of hydroquinone, and 60 g. of butadiene were heated in a shaker tube for two hours at 200° C. The 4-cyano-5-(beta-cyanoethyl)-cyclohexene was obtained in 30% conversion and 90 to 95% yield, based on dicyanobutene used.

*Example 3.*—Preparation of unsaturated dinitrile from 1,4-dicyano-2-butene. Two thousand grams of 1,4-dicyano-2-butene, 3000 g. of butadiene, 30 g. of hydroquinone, and 10 g. of triethylamine were heated in a stainless steel autoclave at 200° C. for four hours. The dinitrile product was obtained in 46.8% conversion and 74% yield based on the dicyano-butene. The product was cooled to 4° C. and the precipitated solid, which appeared to be the trans isomer of 4-cyano-5-(beta-cyanoethyl)-cyclohexene, was filtered off, leaving the crude cis isomer in the filtrate. Analysis for trans isomer: C, 74.95; H, 7.61; N, 17.49. Analysis for cis isomer: C, 74.95; H. 7.71; N, 17.47.

*Example 4.*—Preparation of trans isomer of unsaturated dinitrile. Seventy parts of butadiene, 70 parts of trans-1,4-dicyano-1-butene and 1 part of hydroquinone were held at 200° C. for 8 hours in a pressure vessel. On distillation of the product, 36.9 parts of dicyanobutene and 41.1 parts of trans-4-cyano-5-(beta-cyanoethyl)cyclohexene were obtained. This is a 59.2% conversion and a 78.8% yield. Only trans isomer was formed.

*Example 5.*—Preparation of cis isomer of unsaturated dinitrile. Sixty parts of cis-1,4-dicyano-1-butene, 70 parts of butadiene and 1 part of hydroquinone were heated for 8 hours at 200° C. The reaction mixture was filtered and distilled. A 60% yield of cis-4-cyano-5-(beta-cyanoethyl)cyclohexene was obtained which remained liquid even after being seeded with the trans isomer.

*Example 6.*—Preparation of unsaturated dinitrile using excess of dicyanobutene. Twenty-five parts of butadiene, 130 parts of cis-1,4-dicyano-1-butene and 1 part of hydroquinone were heated for 8 hours at 200° C. By distillation 37.5 parts of cis-4-cyano-5-(beta-cyanoethyl)cyclohexene and 96.2 parts of dicyanobutene were obtained. This corresponds to a yield of 51% based on butadiene and of 75% based on dicyanobutene.

*Example 7.*—Preparation of saturated dinitrile. One thousand parts of 4-cyano-5-(beta-cyanoethyl)cyclohexene (mixture of cis and trans isomers as prepared in Example 3), 20 parts of 10% palladium-on-alumina catalyst and 2500 parts of dioxane were treated with 70 to 100 atmospheres hydrogen with stirring in an autoclave at room temperature to 50° C. Approximately 12 parts of hydrogen were absorbed during one hour. The catalyst was separated by filtration and the filtrate was concentrated under reduced pressure and distilled to give a 92% yield of the mixed isomers of 1-cyano-2-(beta-cyanoethyl)cyclohexene having B. P. 105° to 127° C./0.1 to 0.6 mm. and a refractive index $n_D^{25}=1.4760$.

*Example 8.*—Preparation of saturated diamine. 1-Aminomethyl-2-(gamma-aminopropyl)-cyclohexene was prepared by hydrogenating 65 g. of 1-cyano-2-(beta-cyanoethyl)cyclohexene in 60 g. of methanol and 15 g. of ammonia, using 25 g. of activated Raney nickel catalyst. The hydrogenation was carried out at a temperature of from 50° to 90° C. and at a hydrogen pressure of 500 pounds per square inch, maintained for about three hours. The product boiled at 98° C./2 mm. This diamine was condensed with terephthalic acid to give a polyamide characterized by unusually low water sensitivity.

*Example 9.*—Preparation of saturated diamine by hydrogenation of unsaturated dinitrile. A mixture of 700 parts of 4-cyano-5-(beta-cyanoethyl)cyclohexene (mixture of cis and trans isomers), 3000 parts of purified dioxane, 150 parts of cobalt catalyst prepared by reduction of the oxide, and 20 parts of 10% palladium-on-alumina catalyst was treated with hydrogen at 100 to 160 atmospheres pressure, first at room temperature and later at 125° C. A total of approximately 40 parts of hydrogen was absorbed during a reaction time of 2 hours. The catalysts were removed by filtration, the solvent was removed under reduced pressure and the residue was fractionated to give 432 parts (58%) of colorless 1-aminomethyl-2-(gamma-aminopropyl)cyclohexane (mixture of cis and trans isomers) having a boiling point of 74° to 86° C./0.15–0.5 mm. and a refractive index, $n_D^{25}=1.4925$. The neutral equivalent calculated for $C_{10}H_{22}N_2$: 85.2. Found: 85.2.

*Example 10.*—Preparation of trans isomer of saturated diamine. A stainless steel shaker tube was charged with 104 parts of trans-1-cyano-2-(beta-cyanoethyl)cyclohexane and 10 parts of stabilized cobalt-on-alumina catalyst, and 75 parts of anhydrous ammonia was introduced. The tube was pressured with hydrogen, shaken and heated to 125° to 130° C., maintaining the pressure of hydrogen in the range 1500 to 2000 lbs./sq. in. through periodic injection of hydrogen as the reaction proceeded. At the end of two hours the hydrogenation was judged to be complete. The suspension was filtered to remove catalyst, the methanol was removed by distillation at atmospheric pressure, and the products were separated by fractional distillation at reduced pressure. A total of 97.9 parts (89.7% yield) of trans-1-aminomethyl-2-(gamma-aminopropyl)cyclohexane was isolated together with 2.8 parts low-boiling material and a small non-distillable residue. On redistillation the trans-1-aminomethyl-2-(gamma-aminopropyl)cyclohexane boiled at 85° C./0.4 mm., and had the following constants: refractive index, $n_D^{25}=1.4901$; density, $d^{25}=0.9315$.

*Example 11.*—Preparation of cis isomer of saturated diamine. The pressure tube described in Example 10 was charged with 80 parts of cis-1-cyano-2-(beta-cyanoethyl) cyclohexane, 10 parts of cobalt-on-alumina catalyst and 50 parts of anhydrous ammonia. The hydrogenation was carried out at 2000 to 3000 lbs./sq. in. pressure at 125° C. for a period of three hours. Fractional distillation of the reaction mixture gave 70.1 parts cis-1-aminomethyl-2-(gamma-aminopropyl) cyclohexane corresponding to an 83.5% yield, 3.2 parts low-boiling material and 4.2 parts nondistillable residue. On redistillation the cis-1-aminomethyl-2-(gamma-aminopropyl) cyclohexane boiled at 85° C. under a pressure 0.4 mm. mercury, absolute, and had the following constants: refractive index, $n_D^{25}=1.4920$; density, $d^{25}=0.9362$. Analysis calculated for $C_{10}H_{22}N_2$: C, 70.52; H, 13.02; N, 16.45; neutral equivalent, 85.2; molecular refractivity, 53.30. Found: C, 70.64; H, 12.88; N, 16.28; neutral equivalent, 85.3; molecular refractivity, 52.77.

*Example 12.*—Preparation of unsaturated diamine. Eighty parts of 4-cyano-5-(beta-cyanoethyl) cyclohexene (mixture of cis and trans isomers), 15 parts of cobalt catalyst prepared by reduction of the oxide, and 100 parts of purified dioxane were treated with hydrogen at 120° to 125° C. and 100 to 200 atmospheres pressure. Approximately 4 parts of hydrogen were absorbed during 2 hours reaction time. The catalyst was removed by filtration using methanol for rinsing. The clear filtrate was concentrated under reduced pressure and the residue was fractionated to give 70.5 parts of a mixture of the saturated and unsaturated diamine having a boiling point of 105° to 112° C./1.6 mm. and a refractive index, $n_D^{25}=1.5071$. Calculated for $C_{10}H_{20}N_2$: neutral equivalent, 84.1. Found: neutral equivalent, 84.8. Hydrogen absorbed using platinum catalyst in ethanol as percent of amount calculated for $C_{10}H_{20}N_2$: 55%.

Using finely divided sodium plus ethanol as the reducing agent, a mixture of the cis and trans isomers of 4-aminomethyl-5-(gamma-aminopropyl) cyclohexene was obtained in 51% yield. The unsaturated nature of this compound was shown by its absorption of 75% of the calculated amount of hydrogen, using platinum catalyst in ethanol.

*Example 13.*—Preparation of unsaturated dibasic acid ester. 4-Carboxy-5-(beta-carboxyethyl) cyclohexene, obtained as in Example 1 by hydrolysis of 4-cyano-5-(beta-cyanoethyl)-cyclohexene, was esterified with ethanol to give the diethyl ester, having a boiling point of 140° to 150°/1 mm., and a refractive index, $n_D^{25}=1.4716$.

*Example 14.*—Preparation of ester of saturated dibasic acid. 1-Carboxy-2-(beta-carboxyethyl) cyclohexane, obtained by hydrolysis of the 1-cyano-2-(beta-cyanoethyl) cyclohexane of Example 7, was esterified with ethanol to give the diethyl ester, having a boiling point of 138° to 141°/3 mm.

*Example 15.*—Preparation of dimethyl ester and cyano methyl ester of the trans isomer of the unsaturated dibasic acid. A sample of trans-4-cyano-5-(beta-cyano-ethyl) cyclohexene, such as that obtained in Example 3, was subjected to methanolysis, using methanol, sulfuric acid, and the amount of water calculated to give the diester. There was obtained a 65% yield of a mixture of the dimethyl ester and the cyano methyl ester, which were separated by distillation. The dimethyl ester of trans-4-carboxy-5-(beta-carboxyethyl)-cyclohexene has the following properties: B. P. 103°–104° C./0.15 mm.; $n_D^{25}$ $^{C.}=1.4701$. Calculated for $C_{12}H_{18}O_4$: C, 63.7%; H, 8.03%. Found: C, 63.8%; H, 8.09%. The ester was still liquid at —50° C. The methyl ester of trans-4-cyano-5-(beta-carboxyethyl) cyclohexene had a boiling point of 111°–115° C./0.1 mm., a refractive index, $n_D^{25}$ $^{C.}=1.4800$, and a melting point of 14° to 21° C.

*Example 16.*—Preparation of ester of the saturated dibasic acid. A mixture of 52 parts of 1-carboxy-2-(beta-carboxyethyl) cyclohexane (mixture of cis and trans isomers), 108 parts of 3,5,5-trimethylhexyl alcohol, 160 parts of toluene and 2 parts of 96% sulfuric acid was heated with azeotropic separation of water formed in the reaction. After 4 hours, 11 parts of aqueous layer had been collected. The light yellow reaction mixture was cooled, neutralized, extracted with dilute sodium carbonate solution, washed with water and dried over sodium sulfate. Distillation in a simple still gave 117 parts (ca. 100%) of crude product.

When redistilled in a molecular type still at 0.1–0.3 mm., the di-3, 5, 5-trimethylhexyl ester of 1-carboxy-2-(beta-carboxyethyl) cyclohexane (mixture of cis and trans isomers) having a refractive index, $n_D^{25}=1.4593$, was obtained. Analysis calculated for $C_{28}H_{52}O_4$: C, 74.28; H, 11.58. Found: C, 74.12; H, 11.55.

The novel compound of the present invention may also be designated as beta-(6-cyano-3-cyclohexene)propionitrile. In accordance with this latter terminology, the partial hydrogenation product, obtainable by the method of Example 7, would be designated as beta-(2-cyanocyclohexane)propionitrile, and the complete hydrogenation product, obtainable by the method of Example 9, would be designated as gamma-(2-aminomethylcyclohexane) propylamine.

I claim:

The compound, 4-cyano-5-(beta-cyanoethyl)-cyclohexene, having the formula

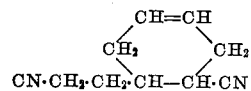

IRVING D. WEBB.

REFERENCES CITED

The following references are of record in the file of this patent:

UNITED STATES PATENTS

| Number | Name | Date |
|---|---|---|
| 2,217,632 | Wolfe | Oct. 8, 1940 |
| 2,448,755 | Zellner | Sept. 7, 1948 |

Certificate of Correction

Patent No. 2,534,088                                   December 12, 1950

IRVING D. WEBB

It is hereby certified that error appears in the printed specification of the above numbered patent requiring correction as follows:

Column 4, lines 17, 21 and 22, respectively, for "cyclohexene" read *cyclohexane*; line 33, for "unsaurated" read *unsaturated*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*